(12) United States Patent
Zähe

(10) Patent No.: US 10,436,344 B2
(45) Date of Patent: *Oct. 8, 2019

(54) PRESSURE-BALANCED PUSH-TYPE MANUAL ACTUATION MECHANISM FOR A VALVE

(71) Applicant: Sun Hydraulics, LLC, Sarasota, FL (US)

(72) Inventor: Bernd Zähe, Sarasota, FL (US)

(73) Assignee: SUN HYDRAULICS, LLC, Sarasota, FL (US)

( * ) Notice: Subject to any disclaimer, the term of this patent is extended or adjusted under 35 U.S.C. 154(b) by 106 days.

This patent is subject to a terminal disclaimer.

(21) Appl. No.: 15/797,186

(22) Filed: Oct. 30, 2017

(65) Prior Publication Data

US 2019/0128439 A1 May 2, 2019

(51) Int. Cl.

| F16K 31/06 | (2006.01) |
|---|---|
| F16K 31/60 | (2006.01) |
| F16K 31/124 | (2006.01) |
| F16K 31/42 | (2006.01) |
| F16K 31/44 | (2006.01) |
| F16K 35/04 | (2006.01) |
| F16K 39/02 | (2006.01) |

(52) U.S. Cl.
CPC ........ *F16K 31/0655* (2013.01); *F16K 31/124* (2013.01); *F16K 31/42* (2013.01); *F16K 31/44* (2013.01); *F16K 31/60* (2013.01); *F16K 35/04* (2013.01); *F16K 39/022* (2013.01)

(58) Field of Classification Search
CPC .. F16K 31/05; F16K 31/0655; F16K 31/0686; F16K 31/0693; F16K 31/124; F16K 31/42; F16K 31/44; F16K 31/60; F16K 35/04; F16K 39/022

USPC .................................. 251/129.03, 129.07
See application file for complete search history.

(56) References Cited

U.S. PATENT DOCUMENTS

| 4,624,441 A | * | 11/1986 | Kreitchman | .......... F16K 31/406 244/100 A |
| 5,439,030 A | * | 8/1995 | Cazcarra Pallaruelo | ........................ F16K 47/04 137/614.11 |
| 5,971,356 A | * | 10/1999 | Offenwanger | ............ F16K 1/00 137/614.16 |
| 6,460,567 B1 | * | 10/2002 | Hansen, III | ............. F16K 31/04 137/554 |
| 6,640,830 B2 | * | 11/2003 | Zahe | ....................... F16K 17/10 137/491 |

(Continued)

*Primary Examiner* — Matthew W Jellett
(74) *Attorney, Agent, or Firm* — McDonnell Boehnen Hulbert & Berghoff LLP

(57) ABSTRACT

An example push-type manual actuation mechanism includes: a piston having: (i) a first flanged portion with a first annular surface area, (ii) a second flanged portion with a second annular surface area, (iii) a longitudinal cavity bounded by an interior peripheral surface of the piston, and (iv) a shoulder on the interior peripheral surface of the piston; and a pin disposed in the longitudinal cavity of the piston, where the pin has a flanged portion interfacing with and resting against the shoulder of the piston, such that a force applied on the pin in a given axial direction is transferred to the piston, and wherein a difference between the second annular surface area of the second flanged portion and the first annular surface of the first flanged portion is substantially equal to a cross-sectional area of the pin.

20 Claims, 4 Drawing Sheets

(56) References Cited

U.S. PATENT DOCUMENTS

| | | | |
|---|---|---|---|
| 6,772,990 B2* | 8/2004 | Sasaki | F04B 27/1804 137/625.17 |
| 7,104,283 B2* | 9/2006 | Ino | F15B 13/0402 137/625.65 |
| 7,467,642 B2* | 12/2008 | Prinsen | F16K 17/0433 137/491 |
| 2013/0313453 A1* | 11/2013 | Hilzendegen | F16K 31/408 251/129.03 |
| 2019/0128441 A1* | 5/2019 | Zahe | F16K 31/1221 |
| 2019/0128443 A1* | 5/2019 | Zahe | F16K 39/022 |

* cited by examiner

500

502 — PUSHING A KNOB OF A PUSH-TYPE MANUAL ACTUATION MECHANISM OF A VALVE, WHERE THE KNOB IS COUPLED TO A PISTON OF THE PUSH-TYPE MANUAL ACTUATION MECHANISM, WHERE THE PISTON IS PRESSURE-BALANCED, AND WHERE PUSHING THE KNOB CAUSES THE PISTON TO MOVE AXIALLY, THEREBY CAUSING A DETENT MECHANISM OF THE PUSH-TYPE MANUAL ACTUATION MECHANISM TO BE ENGAGED

504 — RELEASING THE KNOB TO LOCK THE PISTON IN PLACE, THEREBY LOCKING THE VALVE IN A PARTICULAR STATE

FIG. 7

PRESSURE-BALANCED PUSH-TYPE MANUAL ACTUATION MECHANISM FOR A VALVE

BACKGROUND

A hydraulic valve directs the flow of a liquid medium, usually oil, through a hydraulic system. The direction of the oil flow is determined by the position of a spool or a poppet. An example valve may have a movable element inside a housing or sleeve. For instance, the valve may include a poppet that is movable by an actuation mechanism (e.g., electric, hydraulic, pneumatic, or manual). The poppet may be seated on a valve seat formed inside the housing. Once the valve is actuated, the poppet moves off the seat to allow flow around the poppet from a first port to a second port. In another example, the valve may be normally-open, and when the valve is actuated, the poppet is seated to block flow through the valve.

In examples, if the valve is a manually-actuated valve, then to actuate the valve, an operator may apply a large force to overcome a large spring force applied by a spring having a high spring rate and cause the poppet to be move. If the valve is electrically-actuated, e.g., via a solenoid, in some cases, the solenoid fails and it may be desirable to have a manual override feature to allow the valve to be manually activated to place a machine in a safe condition. Using the manual override feature could also involve applying the large force that overcomes the aforementioned large spring force.

Further, in some examples, it may be desirable to include a detent mechanism in the valve such that when the valve is actuated the detent mechanism is engaged to keep the movable element locked in place. In the case of a large spring force, the detent mechanism is configured to be able to oppose the large spring force, and as such the detent mechanism may be complicated and costly.

Therefore, it may be desirable to have a valve that has a manual actuation mechanism that enables using a soft spring having a small spring rate such that the manual actuation force is reduced and the complexity and cost of an associated detent mechanism is also reduced.

SUMMARY

The present disclosure describes implementations that relate to pressure-balanced push-type manual actuation mechanism for a valve. In a first example implementation, the present disclosure describes a push-type manual actuation mechanism for a valve. The push-type manual actuation mechanism includes: (i) a piston having: (a) a first flanged portion with a first annular surface area, (b) a second flanged portion with a second annular surface area, where the first flanged portion and the second flanged portion project from an exterior peripheral surface of the piston, (c) a longitudinal cavity bounded by an interior peripheral surface of the piston, and (d) a shoulder on the interior peripheral surface of the piston; and (ii) a pin disposed in the longitudinal cavity of the piston, where the pin has a flanged portion interfacing with and resting against the shoulder of the piston, such that a force applied on the pin in a given axial direction is transferred to the piston, and where a difference between the second annular surface area of the second flanged portion and the first annular surface of the first flanged portion is substantially equal to a cross-sectional area of the pin.

In a second example implementation, the present disclosure describes another push-type manual actuation mechanism for a valve. The push-type manual actuation mechanism includes: (i) a knob; (ii) a sleeve having has a first longitudinal cavity therein; (iii) a piston disposed in the first longitudinal cavity coaxial with the sleeve, where the knob is coupled to the piston such that as the knob is pushed in a first axial direction, the piston moves in the first axial direction along with the knob, where the piston has: (a) a first flanged portion having a first annular surface area, (b) a second flanged portion having a second annular surface area, where the first flanged portion and the second flanged portion project from an exterior peripheral surface of the piston, (c) a second longitudinal cavity bounded by an interior peripheral surface of the piston, and (d) a shoulder on the interior peripheral surface of the piston; and (iv) a pin disposed and axially movable in the second longitudinal cavity of the piston, where an end of the pin is configured to be subjected to pressurized fluid from an inlet of the valve, where the pin has a flanged portion interfacing with and resting against the shoulder of the piston, such that a force applied on the end of the pin via the pressurized fluid in a second axial direction opposite the first axial direction is transferred to the piston, and where a difference between the second annular surface area of the second flanged portion and the first annular surface of the first flanged portion is substantially equal to a cross-sectional area of the pin.

In a third example implementation, the present disclosure describes a valve. The valve includes: a main valve section including: (i) a housing, (ii) a sleeve disposed in the housing, where the sleeve defines a first port and a second port, and (iii) a movable element configured to move axially within the sleeve. The valve also includes a push-type manual actuation mechanism including: (i) a knob; (ii) a piston coupled to the knob, where the piston has: (a) a first flanged portion having a first annular surface area, (b) a second flanged portion having a second annular surface area, where the first flanged portion and the second flanged portion project from an exterior peripheral surface of the piston, (c) a longitudinal cavity bounded by an interior peripheral surface of the piston, and (d) a shoulder on the interior peripheral surface of the piston; and (iii) a pin disposed in the longitudinal cavity of the piston. The pin is disposed adjacent the movable element of the main valve section, where the pin has a flanged portion interfacing with and resting against the shoulder of the piston, such that a force applied on the pin in a first axial direction via pressurized fluid received at the first port or the second port acting on a cross-sectional area of the pin is transferred to the piston. A difference between the second annular surface area of the second flanged portion and the first annular surface area of the first flanged portion is substantially equal to the cross-sectional area of the pin, such that when pressurized fluid is communicated to the first annular surface area and the second annular surface area, the piston is pressure-balanced. When the knob is pushed in a second axial direction opposite the first axial direction, the piston moves in the second axial direction along with the knob, causing the pin to move in the second axial direction, engage the movable element, and cause the movable element to move in the second axial direction.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 7 illustrates a flowchart of an example method of operating a valve, in accordance with an example implementation.

DETAILED DESCRIPTION

Figure 1:
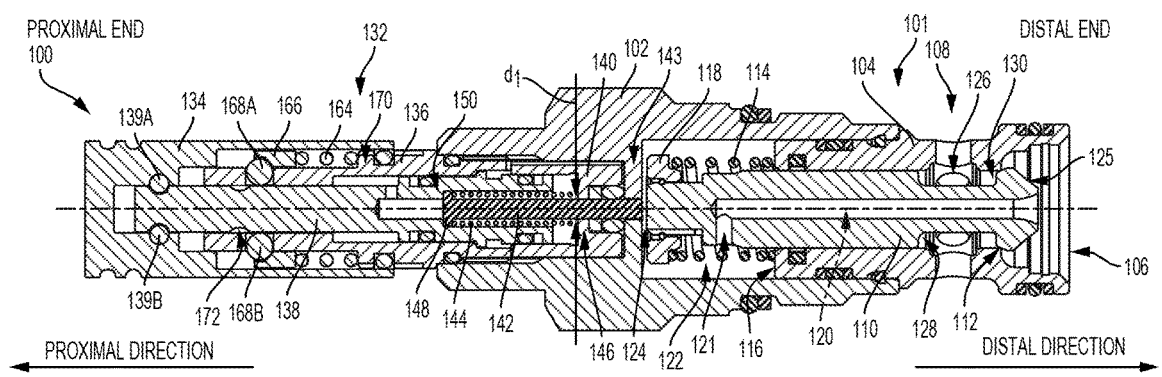
FIG. 1 illustrates a cross-sectional view of an example valve in a closed position, in accordance with an example implementation.

In examples, a valve may have a poppet that is seated on a seat formed as a protrusion from an interior peripheral surface of a cage, sleeve, valve body, or housing. When the poppet is unseated and moves within the valve body, a gap is formed between an exterior peripheral surface of the poppet and the seat, thereby allowing fluid to flow from an inlet through the gap to an outlet. The valve may be a proportional valve where an axial position of the poppet affects the flow rate across the valve for a given pressure drop between the inlet and the outlet.

In examples, the valve may be actuated using a force generated by an electric current provided to a solenoid or by direct manual actuation. If the valve is actuated via a solenoid, it may be desirable to have a manual-override feature to allow manual actuation of the valve in the case of the solenoid not operating properly. An example manual actuation of the valve may have a movable element, such as a pin, that is subjected to inlet pressure of the valve, which could be as high as 6000 pounds per square inch (psi). The inlet pressure thus applies a large force on the pin. For instance, for a pin having a diameter of 0.078 inches, the force may be 28.65 lbs. To maintain the pin within a particular chamber of the valve and preclude the pin from moving when subjected to pressure spikes at the inlet of the valve, a spring with a large spring rate may be disposed in the manual actuation mechanism to oppose the large force applied to the pin. For instance, the spring may be configured to apply a force of about 30 to 35 lbs or more to oppose the force applied to the pin. Whether the valve is manually actuated or includes a manual override feature, to actuate the valve, an operator may apply a large force against the large spring force and against friction of seals and other springs within the valve. Such large force that the operator applies may be difficult to achieve and may lead to operator fatigue.

Further, in some valve configurations, the pressure at the inlet is communicated to the manual actuation mechanism and the operator may apply a force that opposes both the spring force and the inlet pressure applied on a component within the manual actuation mechanism. As the poppet moves, the pressure at the inlet may change as fluid flows from the inlet to the outlet of the valve. Thus, the force that the operator has been applying to overcome an initial inlet pressure may cause the poppet to move unexpectedly, causing large unexpected changes in the flow rate across the valve. This configuration may render the valve operating as an on-off valve, as opposed to a proportional valve as may be desired. Such sudden changes in flow rate may cause an actuator (e.g., a cylinder or motor) or any other component controlled by the valve to move faster or slower than expected, which may be undesirable.

Thus, it may be desirable to configure the valve such that the manual actuation mechanism is pressure-balanced regardless of the pressure level at the inlet. This way, a soft spring may be used rather than a stiff spring having a large spring rate. Also, a pressure-balanced configuration is insensitive to the pressure level at the inlet, and thus the operator can operate the valve proportionally as the change in pressure level at the inlet might not affect the amount of force that the operator applies to move the poppet.

FIG. 1 illustrates a cross-sectional view of an example valve 100 in a closed position, in accordance with an example implementation. The valve 100 may include a main valve section 101 that includes a housing 102, where the housing 102 defines a longitudinal cylindrical cavity therein. The longitudinal cylindrical cavity of the housing 102 is configured to receive a cage or sleeve 104 coaxial with the housing 102. The sleeve 104 defines a first opening or port 106 and a second opening or port 108. The first port 106 is defined at an end or a nose of the sleeve 104, whereas the second port 108 may be defined as holes disposed in a radial array about an exterior peripheral surface of the sleeve 104.

In examples, the first port 106 may be fluidly coupled to a source of pressurized fluid (e.g., a pump, an accumulator, or any other hydraulic component of a hydraulic system). The valve 100 is configured to control flow of fluid from the source of pressurized fluid to a tank or another hydraulic component (e.g., another valve) fluidly coupled to the second port 108. For instance, the valve 100 may represent a relief valve that relieves or limits the pressure at an outlet of a pump in a hydraulic system by diverting high pressure fluid to a reservoir. The valve 100 might represent other types of valves as well.

In other examples, the second port 108 may be fluidly coupled to the source of pressurized fluid, and the valve 100 controls flow of fluid from the source of pressurized fluid to a tank or another hydraulic component fluidly coupled to the first port 106. This way, the valve 100 may be referred to as bi-directional as the valve 100 is configured to allow and control fluid flow from the first port 106 to the second port 108 and from the second port 108 to the first port 106.

The sleeve 104 defines a respective longitudinal cylindrical cavity therein. A poppet 110 is disposed in the cavity defined within the sleeve 104, and the poppet 110 is coaxial with the housing 102 and the sleeve 104. In the closed position shown in FIG. 1, the poppet 110 is seated on a seat 112 defined as an annular protrusion in an interior peripheral surface of the sleeve 104. The poppet 110 has a respective protrusion formed as a tapered circumferential, conical surface that contacts the seat 112 when the poppet 110 is seated (e.g., when the valve 100 is unactuated).

The valve 100 further includes a spring 114 disposed around an exterior peripheral surface of the poppet 110 between an end 116 of the sleeve 104 and a spring cap 118 coupled to an exterior surface of the poppet 110. The spring 114 applies a force on the spring cap 118, and thus on the poppet 110, in a proximal or closing direction (e.g., to the left in FIG. 1).

Further, the poppet 110 includes a longitudinal internal channel 120 and radial channel 121 that communicate fluid received at the first port 106 to a chamber 122 defined within the housing 102. In this manner, if the first port 106 is fluidly coupled to the source of pressurized fluid, the pressurized fluid at the first port 106 is communicated to a back end 124 of the poppet 110. The pressurized fluid in the chamber 122 acts on a surface area of the back end 124 of the poppet 110 that is substantially identical or equal to a respective surface area of a front end 125 of the poppet 110 on which the pressurized fluid at the first port 106 acts. With this configuration, the poppet 110 is pressure-balanced, and the spring 114 applying a force in the closing direction on the poppet 110 maintains the poppet 110 seated at the seat 112.

If the second port 108 is fluidly coupled to the source of pressurized fluid, the pressurized fluid received at the second port 108 is communicated through the holes in the sleeve 104 to an annular chamber 126 formed between the exterior peripheral surface of the poppet 110 and the interior peripheral surface of the sleeve 104. The pressurized fluid in the chamber 126 acts on surface areas of a first annular surface 128 and a second annular surface 130 of the poppet 110, where the surface areas are substantially identical or equal to each other. This way, the poppet 110 is pressure-balanced, and the spring 114 applying a force in the closing direction on the poppet 110 maintains the poppet 110 seated at the seat 112. Therefore, the valve 100 may be referred to as a normally-closed valve that is double-blocking because fluid is blocked from flowing across the valve from the first port 106 to the second port 108 and from the second port 108 to the first port 106 when the valve 100 is unactuated.

The poppet 110 is configured to move axially in the longitudinal cavity defined within the sleeve 104 when the valve 100 is actuated by a push-type manual actuation mechanism 132. The push-type manual actuation mechanism 132 includes a knob 134 that defines a respective longitudinal cylindrical cavity therein. The term "push-type" indicates, for example, that the push-type manual actuation mechanism 132 is operated via a force or contact applied to the knob 134 in a pushing direction (e.g., the distal direction to the right in FIG. 1). Also, the term "manual" indicates, for example, an operator or some other device (e.g., a lever, an arm of a robot, a component of a machine, etc.) applying a force to the knob 134.

A sleeve 136 is fixedly disposed partially in the cavity defined within the knob 134 and partially in a cavity defined within a proximal end of the housing 102. The sleeve 136 is coaxial with the knob 134 and the housing 102.

Further, the sleeve 136 defines a respective longitudinal cylindrical cavity therein and houses a piston 138 that is axially movable within the longitudinal cylindrical cavity of the sleeve 136. The piston 138 may include one or more grooves on an exterior peripheral surface thereof that correspond to respective one or more grooves in the interior peripheral surface of the knob 134, such that roll pins 139A and 139B are disposed partially in the grooves of the piston 138 and partially in the grooves of the knob 134. With this configuration, the knob 134 is coupled to the piston 138, such that moving the knob 134 axially causes the piston 138 to move axially therewith.

A plug or spacer 140, which may be ring-shaped, is disposed within the cavity defined at the proximal end of the housing 102. The spacer 140 interfaces with the sleeve 136 and is configured to house a portion of the piston 138 in a cavity defined within the spacer 140.

The piston 138 also defines therein a respective longitudinal cylindrical cavity that houses a pin 142. The pin 142 extends longitudinally between the piston 138 and the poppet 110. The housing 102 includes a protrusion 143 emanating from the interior peripheral surface of the housing 102 to define a restriction therein through which the pin 142 is disposed. In the position shown in FIG. 1, where the valve 100 is in a closed position, the pin 142 reaches the chamber 122 of the main valve section 101; however, the pin 142 might not be in contact with the poppet 110.

The push-type manual actuation mechanism 132 further includes a spring 144 disposed about an exterior peripheral surface of the pin 142 within the cavity defined by the piston 138. The spring 144 is supported between (i) a protrusion or shoulder 146 defined by the interior peripheral surface of the spacer 140, and (ii) a flanged portion 148 formed at the proximal end of the pin 142. The flanged portion 148 represents an area or portion of the pin 142 that has an enlarged diameter.

The spacer 140 is fixed, whereas the pin 142 is axially movable relative to the spacer 140. Thus, the spring 144 applies a force on the pin 142 that maintains the pin 142 biased in the proximal direction, e.g., to the left in FIG. 1.

Further, the piston 138 defines a shoulder 150 (e.g., a stepped surface with a reduction in internal diameter of the piston 138) against which the pin 142 rests. Specifically, the flanged portion 148 of the pin 142 rests against the shoulder 150, such that forces applied to the pin 142 in the proximal direction (e.g., to the left in FIG. 1) are transferred to the piston 138 via the shoulder 150. Also, if the piston 138 moves in the distal direction (e.g., to the right in FIG. 1), the piston 138 applies a force on the pin 142 via the shoulder 150 causing the pin 142 to move with the piston 138 in the distal direction against a force of the spring 144.

In operation, pressurized fluid may be received at the first port 106, for example, and the pressurized fluid is communicated through the longitudinal internal channel 120 and the radial channel 121 to the chamber 122. The pressurized fluid in the chamber 122 applies a force on the pin 142 in a proximal direction, e.g., to the left in FIG. 1. This force may be determined as the pressure level of the pressurized fluid in the chamber 122 multiplied by cross-sectional area "$A_1$" of the pin 142 that is equal to $$\frac{\pi d_1^2}{4}$$

where "$d_1$" is the diameter of the pin 142 as labelled in FIG. 1. Thus, assuming that the pressure level of the pressurized fluid "P," then the force applied to the pin 142 is $=PA_1$. This force acts in a proximal axial direction, e.g., to the left in FIG. 1, and the force is transferred to the piston 138 via the shoulder 150.

Figure 2:
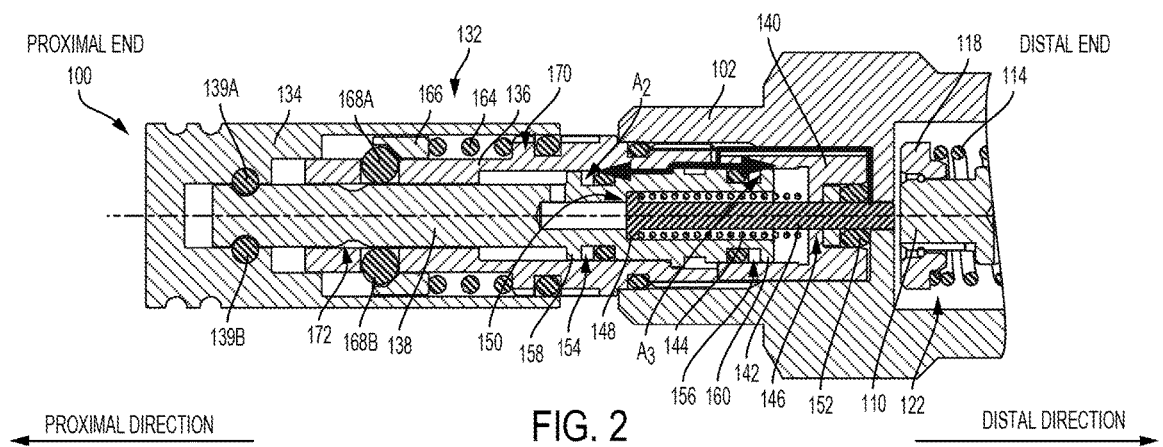
FIG. 2 illustrates a zoomed-in view of a portion of the valve shown in FIG. 1 including a push-type manual actuation mechanism, in accordance with an example implementation.

FIG. 2 illustrates a zoomed-in view of a portion of the valve 100 including the push-type manual actuation mechanism 132, in accordance with an example implementation. The pressurized fluid in the chamber 122 is further communicated through unsealed spaces around the pin 142 to the cavity at the proximal end of the housing 102, which houses the spacer 140. The pressurized fluid may then push an O-ring 152 axially in the proximal direction (e.g., to the left in FIG. 2) in a cavity or axial space defined between an interior peripheral surface of the spacer 140 and the exterior peripheral surface of the pin 142.

The pressurized fluid is then communicated around the spacer 140 through an unsealed space between the exterior surface of the spacer 140 and the interior surface of the housing 102 to the exterior peripheral surface of the piston 138 as indicated by the thick arrows depicted in FIG. 2. The pressurized fluid is thus communicated to a first circumferential annular groove 154 and a second circumferential annular groove 156 defined in the exterior peripheral surface of the piston 138. The first circumferential annular groove 154 is bounded by a flanged portion 158 and the second circumferential annular groove 156 is bounded by a flanged portion 160 defined at a distal end of the piston 138.

The pressurized fluid thus applies a force on an annular surface area "$A_2$" of the flanged portion 158 in a first (proximal) axial direction, and applies a force on an annular surface area "$A_3$" of the flanged portion 160 in a second (distal) axial direction opposite the first (proximal) axial direction. Therefore, the resultant force acting on the piston 138 can be estimated by the following equation:

$$F=PA_1+PA_2-PA_3=P(A_1+A_2-A_3) \quad (1)$$

The valve 100 is configured such that the area difference $A_3-A_2$ is substantially equal to the area $A_1$. As a result, $(A_1+A_2-A_3)$ is substantially equal to zero, and thus the force "F" defined by equation (1) is substantially equal to zero (e.g., within a threshold force value, such as 3 lbs, from zero lbs). The term "substantially" is used, for example, to indicate that the area difference $A_3-A_2$ is equal to the area $A_1$ or within a threshold area or percentage area (e.g., ±1-5%) from the area $A_1$. In addition, by the term "substantially" used above and throughout the description herein, it is meant that the recited characteristic, parameter, measurement, or value need not be achieved exactly, but that deviations or variations, including for example, tolerances, measurement error, measurement accuracy limitations, manufacturing deviations, and other factors known to skill in the art, may occur in amounts that do not preclude the effect the characteristic was intended to provide.

With this configuration, the piston 138 is pressure-balanced because the pressurized fluid communicated from the first port 106 exerts opposing forces on the piston 138 on surface areas that are selected such that the resultant force exerted on the piston 138 is substantially equal to zero. As a result, the spring 144 could be configured as a soft spring having a small spring rate that is sufficient to bias the pin 142 and the piston 138 in the proximal direction (e.g., to the left right in FIG. 2) to maintain the pin 142 separated from the poppet 110 and maintain the valve 100 in a closed state. For example, the spring 144 may exert a small force in a range between 2 lbs and 4 lbs.

As an example for illustration, assuming that the diameter "$d_1$" of the pin 142 is 0.08 inches, then the cross-sectional area "$A_1$" can be determined to be about 0.005 square inches. Assuming that the pressure level "P" is about 5000 psi, then the force applied on the pin 142 in the first (proximal) direction can be determined to be about 25 lbs. If the piston 138 is not pressure-balanced, then the spring 144 would be designed to be a stiff spring to oppose such high force. For instance, the spring 144 would be configured to exert a force of about 30 lbs. However, with the configuration described above where the area difference $A_3-A_2$ is substantially equal to $A_1$, the piston 138 is pressure-balanced, and the spring 144 could be configured as a soft spring with a small spring rate, and the spring 144 applies a small force (e.g., 2-4 lbs) to maintain the valve 100 closed.

The pressure-balanced configuration enabling the spring 144 to be a soft spring, enhances operation of the push-type manual actuation mechanism 132. When an operator pushes the knob 134 (e.g., pushes the knob 134 directly or via a lever coupled to the knob 134) in the distal direction to manually actuate the valve 100, the operator overcomes the force of the spring 144 (and some seal friction) to move the piston 138 in the distal direction. As the piston 138 moves in the distal direction, the piston 138 pushes the pin 142 in the distal direction as well against the spring 144. If the spring 144 has a high spring rate causing a large force (e.g., 30 lbs), then the operator applies a large force (e.g., 36 lbs) to be able to overcome the spring 144 and friction forces to move the piston 138 and the pin 142. However, if the spring 144 is a soft spring with a small spring rate causing a small force (e.g., 4 lbs), then the operator applies a corresponding small force (e.g., 12-18 lbs) to be able to overcome the spring 144 and friction forces to move the piston 138 and the pin 142. This way, operator fatigue may be avoided as the effort exerted in operating the push-type manual actuation mechanism 132 is reduced.

As the pin 142 moves axially in the distal direction, the pin 142 traverses a gap between the pin 142 and the poppet 110 shown in FIGS. 1 and 2. The pin 142 then contacts the poppet 110 and pushes the poppet 110 in the distal direction against the spring 114. The spring 114 could be a soft spring as well due to the poppet 110 being pressure-balanced as described above with respect to FIG. 1. Thus, the increase in opposing force that the operator overcomes while pushing the knob 134 is not increased substantially.

Figure 3:
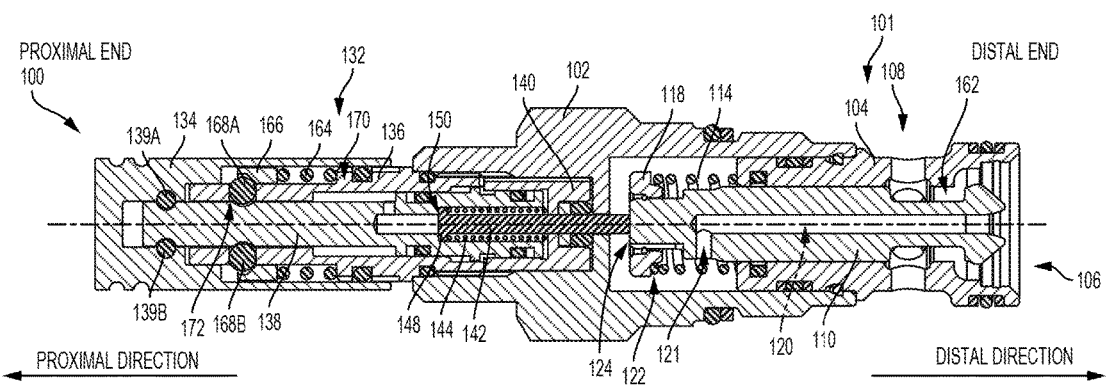
FIG. 3 illustrates a cross-sectional view of the valve shown in FIG. 1 in an open state, in accordance with an example implementation.

As the pin 142 pushes the poppet 110, the poppet 110 is unseated off the seat 112 to open the valve 100. FIG. 3 illustrates a cross-sectional view of the valve 100 in an open state, in accordance with an example implementation. As shown in FIG. 3, the pin 142 is in contact with the back end 124 of the poppet 110 and both the pin 142 and the poppet 110 move together. The poppet 110 is unseated off the seat 112 and a flow area 162 is formed between the exterior peripheral surface of the poppet 110 and internal peripheral surface of the sleeve 104, thus allowing fluid received at the first port 106 to flow around the nose of the poppet 110 to the second port 108.

As mentioned above, the pressure-balanced configuration of piston 138 reduces the effort exerted by the operator in operating the push-type manual actuation mechanism 132 and causing the poppet 110 to be unseated to open the valve 100. Further, with the pressure-balanced configuration, operation of the push-type manual actuation mechanism 132 is insensitive to variation of the pressure level "P" at the first port 106. The pressure level "P" may change during operation of the valve 100. For instance, as soon as the poppet 110 is moved off the seat 112, the pressure level "P" at the first port 106 may collapse (e.g., may be reduced at a high rate of pressure reduction). However, regardless of the pressure level "P," the pressurized fluid is communicated to the push-type manual actuation mechanism 132 and applies forces on the areas $A_1$, $A_2$, and $A_3$ as described above, and the piston 138 is maintained in a pressure-balanced state. Thus, regardless of the variation of the pressure level "P," the operator overcomes a spring force of the spring 144, friction forces, and the force of the spring 114.

This way, consistent operation of the push-type manual actuation mechanism 132 is achieved. In other words, for a given pushing force level that the operator applies on the knob 134, the piston 138 moves in the distal direction a corresponding axial distance that is substantially consistent regardless of the pressure level "P." Thus, proportional control of the valve 100 via manual actuation is enabled.

In some examples, the operator pushes the knob 134 and holds the knob 134 in a pushed position to maintain the valve 100 in an activated or open state. However, if the operator releases the knob 134, the valve 100 may return to an unactivated (closed) state. In other examples, a detent mechanism may be added to the valve 100 as shown in FIGS. 1-3 to enable the operator to release the knob 134, yet lock the valve 100 in an open or activated state.

Referring back to FIGS. 1-2, the valve 100 may include a detent mechanism comprising, for example, a spring 164, a spacer 166, and a plurality of balls (e.g., metal spheres), such as balls 168A, 168B. The balls of the detent mechanism may be disposed in respective holes formed in the sleeve 136, and the balls may be disposed in a radial array about the sleeve 136. FIGS. 1-3 depict the two balls 168A, 168B; however, in other example implementations, more or fewer balls could be used. For instance, four balls may be disposed in a radial array about the sleeve 136.

The spring 164 is constrained between (i) a flanged portion 170 formed as a rim, collar, or rib projecting from the exterior peripheral surface of the sleeve 136, and (ii) the spacer 166. The sleeve 136 is fixed or immovable, while the spacer 166 is slidably disposed about the exterior peripheral surface of the sleeve 136. The spacer 166 may be ring-shaped and is configured to interface with and contact the balls 168A-168B. The spring 164 applies a force on the spacer 166 in the proximal direction, and thus the spacer 166 in turn applies a force on the ball 168A-168B in the proximal direction as well.

Further, the piston 138 defines a groove 172 on the exterior peripheral surface of the piston 138, and the groove 172 operates as a detent. In other example implementations, rather than the groove 172, the exterior peripheral surface of the piston 138 may include holes corresponding to the balls (e.g., the balls 168A-168B) of the detent mechanism. In operation, as the operator pushes the knob 134 in the distal direction, and accordingly pushes the piston 138 via the roll pins 139A, 139B, the groove 172 becomes aligned with the balls (e.g., the balls 168A, 168BB). Under spring pressure from the spring 164 pushing the spacer 166 in the proximal direction, the spacer 166 pushes the balls causing the balls to move partially in, and engage with, the groove 172.

FIG. 3 illustrates the valve 100 locked in the open state with the detent mechanism in an engaged state with the balls 168A-168B disposed in the groove 172. As mentioned above, as the piston 138 is pushed in the distal direction, the pin 142 is also pushed by the piston 138 in the same direction. The pin 142 then contacts and pushes the poppet 110 in the distal direction, thus causing the poppet 110 to move off the seat 112, thereby opening the valve 100 and allowing fluid flow from the first port 106 to the second port 108. If the operator releases the knob 134, the piston 138 does not return back (e.g., does not move in the proximal direction) because the spring 164 maintains pressure on the spacer 166, which maintains respective pressure on the balls 168A, 168B, thus holding the piston 138 in position. With this configuration, the piston 138 is locked in place even when the knob 134 is released, and the valve 100 is thus locked in the open state. To unlock the detent mechanism, additional force may be applied to the knob 134 in the proximal direction (to the left in FIG. 3) to push the balls 168A, 168B out of the groove 172, thus allowing the piston 138 to move in the proximal direction.

The pressure-balanced configuration of the push-type manual actuation mechanism 132 simplifies the detent mechanism described above. Particularly, the pressure-balanced configuration of the push-type manual actuation mechanism 132 enables the valve 100 to operate with a soft spring, i.e., the spring 144. Thus, the detent mechanism holds the piston 138 locked against the small force caused by the spring 144. As such, the spring 164 may also be a soft spring, and no additional components or operations are used to hold the balls 168A, 168B in the detent (e.g., in the groove 172).

Without the piston 138 being pressure-balanced, the spring 144 would have been a stiff spring applying a large force on the piston 138 in the closing direction. In this case, the spring 164 would have been a stiff spring and additional components and operations may be implemented to ensure that the balls 168A, 168B remain engaged with the groove 172 when the knob 134 is released. Thus, the pressure-balanced configuration of the push-type manual actuation mechanism 132 may reduce the cost and complexity of the valve 100.

The configurations and components shown in FIGS. 1-3 are examples for illustration, and different configurations and components could be used. For example, different types of springs could be used. The knob 134 may be replaced by any type of collar coupled to a lever for manual actuation. Also, the detent mechanism shown in FIGS. 1-3 may be used in some configurations and applications, and might not be used in others. As another example, the push-type manual actuation mechanism 132 may be used as a manual override feature in a valve that is primarily actuated by a push-type solenoid actuation mechanism as described next.

Figure 4:
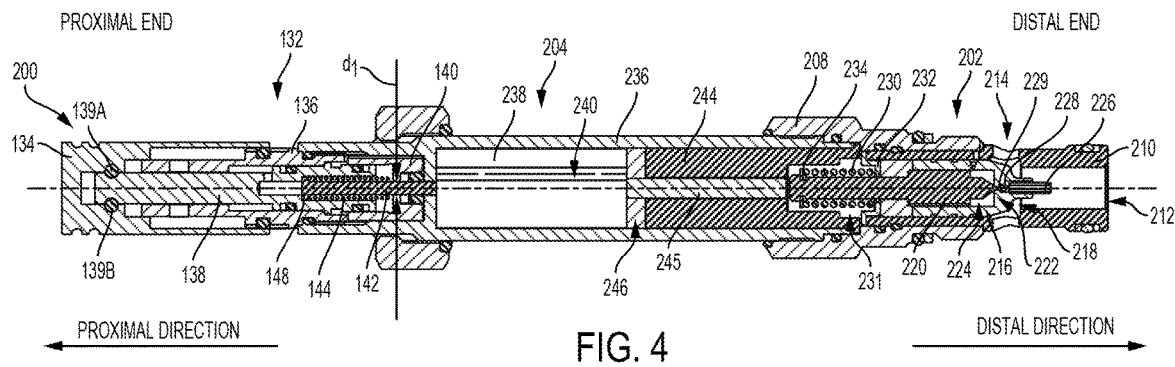
FIG. 4 illustrates a cross-sectional view of another example valve, in accordance with another example implementation.

FIG. 4 illustrates a cross-sectional view of another example valve 200, in accordance with an example implementation. The valve 200 may include a main valve section 202, a push-type solenoid actuator mechanism 204, and the push-type manual actuation mechanism 132 described above.

The main valve section 202 includes a housing 208 that defines a longitudinal cylindrical cavity therein. The longitudinal cylindrical cavity of the housing 208 is configured to receive at a distal or first end thereof a cage or sleeve 210 coaxial with the housing 208. The sleeve 210 defines a first port 212 and a second port 214. The first port 212 is defined at a nose of the sleeve 210, whereas the second port 214 may be defined as holes disposed in a radial array about an exterior surface of the sleeve 210. The valve 200 may be configured to control flow of fluid from the first port 212 to the second port 214 and from the second port 214 to the first port 212.

The sleeve 210 defines a respective longitudinal cylindrical cavity therein, and a first poppet 216 is disposed in the cavity defined within the sleeve 210, where the first poppet 216 is coaxial with the housing 208 and the sleeve 210. The first poppet 216 could also be referred to as a main or primary poppet.

The valve 200 is configured as a normally-open valve where in the open position or state shown in FIG. 4, the valve 200 is unactuated, and the first poppet 216 is unseated off a seat 218 defined by an interior peripheral surface of the sleeve 210. In the open position, the valve 200 may allow free flow from the first port 212 to the second port 214 or free flow from the second port 214 to the first port 212. As described below, the valve 200 can be actuated such that the first poppet 216 is seated on the seat 218. Particularly, the first poppet 216 has a tapered circumferential surface that contacts the seat 218 when the first poppet 216 is seated. In the closed position, the first poppet 216 blocks flow from the second port 214 to the first flow 212 and from the first port 212 to the second port 214.

The first poppet 216 defines a respective longitudinal cylindrical cavity therein. A second poppet 220 is disposed in the cavity defined within the first poppet 216, and the second poppet 220 is coaxial with the housing 208, the sleeve 210, and the first poppet 216. The second poppet 220 may also be referred to as a dart or secondary poppet.

In the open position of the valve 200 shown in FIG. 4, the second poppet 220 is seated on a seat 222 defined by an interior peripheral surface of the first poppet 216. The second poppet 220 has a respective tapered circumferential surface that contacts the seat 222 when the second poppet 220 is seated. Further, a chamber 224 is defined within the first poppet 216 between an exterior peripheral surface of the second poppet 220 and the interior peripheral surface of the first poppet 216.

The valve 200 further includes a roll pin 226 coupled to a ball 228 (e.g., a metal sphere) that operates as a check valve. The roll pin 226 and the ball 228 are disposed within the first poppet 216 at a nose section or a distal end thereof. The ball 228 blocks a longitudinal passage or longitudinal channel 229 defined in the distal end of the first poppet 216, and thus the ball 228 blocks fluid flow from the first port 212 through the nose section of the first poppet 216 and the longitudinal channel 229 to the chamber 224 when the second poppet 220 is unseated. However, if the second poppet 220 is unseated off the seat 222, fluid flows from the chamber 224 though the longitudinal channel 229, pushing the ball 228 and the roll pin 226, to flow to the first port 212.

The valve 200 further includes a spring 230 disposed in a chamber 231 defined within the housing 208. The spring 230 is disposed around an exterior peripheral surface of the second poppet 220 between a spring support member 232 fixedly disposed in the longitudinal cavity of the housing 208 and a washer or retaining ring 234 disposed in a groove defined in the exterior surface of the second poppet 220. When the spring 230 is compressed, the spring 230 applies a force on the retaining ring 234, and thus on the second poppet 220, in an opening or proximal direction (e.g., to the left in FIG. 4).

In examples, the push-type solenoid actuator mechanism 204 may include a solenoid tube 236 disposed within and received at a proximal or second end of the housing 208, such that the solenoid tube 236 is coaxial with the housing 208. A solenoid coil (not shown to reduce visual clutter in the drawings) may be disposed about an exterior surface of the solenoid tube 236.

The solenoid tube 236 is configured to house a plunger or armature 238. The armature 238 defines therein a longitudinal channel 240. Further, the solenoid tube 236 houses a pole piece 244 coaxial with the armature 238 and the solenoid tube 236. The pole piece 244 and the spring support member 232 enclose the chamber 231.

The pole piece 244 further defines a longitudinal channel therein, and a push pin 245 is disposed in the longitudinal channel of the pole piece 244. The pole piece 244 is separated from the armature 238 by an airgap 246, and the push pin 245 interfaces with the armature 238. The pole piece 244 may be composed of material of high magnetic permeability.

When an electric current is provided through the windings of the solenoid coil, a magnetic field is generated. The pole piece 244 directs the magnetic field through the airgap 246 toward the armature 238, which is movable and is attracted toward the pole piece 244. In other words, when an electric current is applied to the solenoid coil, the generated magnetic field forms a north and south pole in the pole piece 244 and the armature 238, and therefore the pole piece 244 and the armature 238 are attracted to each other. Because the pole piece 244 is fixed while the armature 238 is movable, the armature 238 traverses the airgap 246 toward the pole piece 244.

As the armature 238 moves toward the pole piece 244, the armature 238 pushes the push pin 245 in the distal direction, and the push pin 245 then contacts a proximal end of the second poppet 220, and thus causes the second poppet 220 to also move axially against a force of the spring 230. Because the second poppet 220 is seated at the seat 222 and thus contacts the first poppet 216, the second poppet 220 pushes the first poppet 216 in the distal direction toward the seat 218. The extent of axial motion or the axial distance that the armature 238, the push pin 245, the first poppet 220, and the second poppet 216 move may be proportional to a magnitude of electric signal (e.g., electric current) provided to the solenoid coil of the push-type solenoid actuation mechanism 204.

As the first poppet 216 moves toward the seat 218, the flow area defined between the interior peripheral surface of the sleeve 210 and the exterior peripheral surface of the first poppet 216 is restricted. In an example, the magnitude of the electric signal might be such that the first poppet 216 moves toward the seat 218, but is not seated at the seat 218. In other words, the first poppet 216 stops mid-stroke between the position shown in FIG. 4 and a fully seated position at which the first poppet 216 is seated at the seat 218. In this example, if fluid is flowing from the first port 212 to the second port 214, then restricting the flow area causes a pressure level of fluid at the first port 212 to increase or build up. For instance, the pressure level at the first port 212 may increase to a pressure level of 50-70 psi.

In another example, if fluid is flowing from the second port 214 to the first port 212, then restricting the flow area between the interior peripheral surface of the sleeve 210 and the exterior peripheral surface of the first poppet 216 causes a pressure level to increase or build up at the second port 214. The increase in pressure level is based on the magnitude the electric signal to the solenoid coil of the solenoid actuation mechanism 204, where the magnitude of the electric signal determines a position of the first poppet 216 within the longitudinal cavity of the sleeve 210. Further, if the magnitude of the electric signal is sufficient to cause the first poppet 216 to be seated at the seat 218, fluid received at the second port 214 is blocked from flowing to the first port 212.

Once the solenoid coil is de-energized (e.g., command signal to the solenoid coil is reduced or removed), the armature 238 is no longer attracted by a magnetic force toward the pole piece 244, and the spring 230 pushes the second poppet 220 in the proximal direction off the seat 222. As a result, fluid in the chamber 224 is allowed to flow through the longitudinal channel 229, thereby pushing the ball 228 and the roll pin 226, and then flowing to the first port 212. The first port 212 may be fluidly coupled to a low pressure reservoir or tank. Thus, the pressure level in the chamber 224 is reduced as the fluid is vented from the chamber 224 through the first port 212 to the tank.

Further, the fluid received at the second port 214 applies a force on a tapered exterior peripheral surface of a nose or distal end of the first poppet 216. Because of the difference in pressure level between the fluid received at the second port 214 and the fluid in the chamber 224, the first poppet 216 is moved axially in the proximal direction (e.g., to the left in FIG. 4) and is unseated off the seat 218. The first poppet 216 thus follows the second poppet 220 in the proximal direction until the second poppet 220 is reseated at the seat 222. In this position, the valve 200 is reopened and fluid is allowed to flow from the second port 214 to the first port 212.

In some cases, the push-type solenoid actuator mechanism 204 might fail, might become inoperable, or might not operate as expected. In these cases, sending an electric signal to the windings of the solenoid coil might not cause the first poppet 216 to move in the distal direction and the flow from the second port 214 to the first port 212 (or vice versa) is not restricted. As a safety feature, it may be desirable for the valve 200 to include the push-type manual actuation mechanism 132 that allows an operator to manually override the push-type solenoid actuator mechanism 204.

The push-type manual actuation mechanism 132 is described above with respect to FIGS. 1-3. The valve 200 is configured such that the push-type manual actuation mechanism 132 is received at the proximal end of the solenoid tube 236. The push-type manual actuation mechanism 132 is shown in FIG. 4 without the detent mechanism to reduce visual clutter in the drawings; however, it should be understood that the valve 200 could be configured to include the detent mechanism described above.

To use the push-type manual actuation mechanism 132 as a manual override feature, an operator may press or push the knob 134 axially in the distal direction. The knob 134 causes the piston 138 to also move axially in the distal direction. The piston 138 interfaces with the pin 142 at the flanged portion 148 as described above, and thus the pin 142 also moves axially with the piston 138.

As shown in FIG. 4, the distal end of the pin 142 interfaces with a proximal end of the armature 238, and thus as the pin 142 moves in the distal direction, the pin 142 pushes the armature 238 in the distal direction as well. Moving the armature 238 axially in the distal direction causes the valve 200 to operate as described above. In particular, as the armature 238 moves axially, the armature 238 pushes the push pin 245 in the distal direction, thereby causing the push pin 245 to engage and push the second poppet 220, which in turn pushes the first poppet 216 in the distal direction. As described above, moving the first poppet 216 in the distal direction restricts or blocks fluid flow from the second port 214 to the first port 212 based on the extent of distal travel or distance that the knob 134 traverses when the operator pushes the knob 134. If fluid is flowing from the first port 212 to the second port 214, then the inlet pressure at the first port 212 is increased as a result of pushing the knob 134. With this configuration, the operator manually actuates the valve 200 via pushing the knob 134.

As mentioned above, the push-type manual actuation mechanism 132 is configured such that the piston 138 is pressure-balanced. The pressure-balanced configuration enables the spring 144 to be a soft spring, thus enhancing operation of the push-type manual actuation mechanism 132. In particular, operator fatigue may be avoided as the effort exerted in operating the push-type manual actuation mechanism 132 is reduced, operation of the push-type manual actuation mechanism 132 is insensitive to variation of the pressure level "P" at the second port 214, and the detent mechanism described above is simplified.

In other example variations in the configuration of the push-type manual actuation mechanism 132 or the valve including the push-type manual actuation mechanism 132, several components may be integrated into a single component rather than having separate components. As a specific example, the spacer 140 may be integrated with the solenoid tube 236 into a single component as described next.

Figure 5:
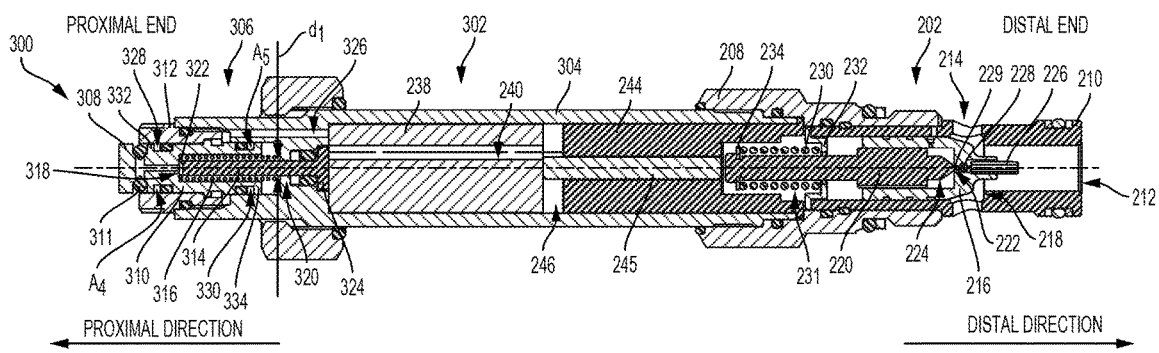
FIG. 5 illustrates a cross-sectional view of another example valve, in accordance with an example implementation.

FIG. 5 illustrates a cross-sectional view of another example valve 300, in accordance with an example implementation. Similar components between the valve 100 and the valve 300 are designated with the same reference numbers. As shown, the main valve section 202 is the same between the valve 200 and the valve 300. The valve 300 includes a push-type solenoid actuator mechanism 302 that is similar to the push-type solenoid actuator mechanism 204, but the spacer 140 is integrated with the solenoid tube 236 to form a differently configured solenoid tube 304 shown in FIG. 3.

The valve 300 includes a push-type manual actuation mechanism 306 that is similar to the push-type manual actuation mechanism 132, but some components are configured differently so as to accommodate features of the valve 300. For example, the push-type manual actuation mechanism 306 is configured to be shorter than the push-type manual actuation mechanism 132 because the valve 300 is depicted without a detent mechanism. However, in other example implementations, a detent mechanism could be added to the valve 300 as well.

As another example, rather than the knob 134 being coupled to the piston 138 via the roll pins 139A, 139B, the valve 300 includes a knob 308 configured as a push button that is directly coupled to the a piston 310. A seal or O-ring 311 is disposed adjacent the knob 308 and is configured to seal the valve 300 from particles or dirt in an environment of the valve 300.

The piston 310 is disposed partially within a longitudinal cavity of a sleeve 312 and partially within a proximal end of the solenoid tube 304. The piston 310 also defines therein a respective longitudinal cylindrical cavity that houses a pin 314 that is similar to the pin 142. The push-type manual actuation mechanism 306 further includes a spring 316 disposed about an exterior peripheral surface of the pin 314. The spring 316 is supported between a shoulder 318 formed by an interior peripheral surface of the piston 310 and a protrusion or shoulder 320 defined by the interior peripheral surface of the solenoid tube 304. The solenoid tube 304 is fixed, whereas the piston 310 is axially movable therein. Thus, the spring 316 applies a force on the piston 310 that maintains the piston 310 biased in the proximal direction.

Further, the pin 314 has a flanged portion 322 at a proximal end of the pin 314, where the flanged portion 322 engages or rests against the shoulder 318 of the piston 310. With this configuration, if the piston 310 moves in the distal direction, the piston 310 causes the pin 314 to move therewith. A distal end of the pin 314 includes a flanged portion 324 that interfaces with the armature 238. Thus, a force applied by the piston 310 on the pin 314 in the distal direction is transferred to the armature 238. And, if a force is applied to the pin 314 via pressurized fluid in the channel 240 in the proximal direction, the force is transferred to the piston 310 at the shoulder 318.

In operation, as described above with respect to the valve 200, the pressurized fluid received at the second port 214 through unsealed spaces to the longitudinal channel 240. The pressurized fluid in the longitudinal channel 240 applies a force on the pin 314 in the proximal direction, where the force is equal to $PA_1$, where $A_1$ is equal to $$\frac{\pi d_1^2}{4}.$$

This force acts in the proximal axial direction, and is transferred to the piston 310 via the shoulder 318.

The solenoid tube 304 further includes a hole 326 (e.g., a drilled hole) that is configured to receive the pressurized fluid from the longitudinal channel 240 and communicate the pressurized fluid through an unsealed space between the interior peripheral surface of the solenoid tube 304 and the exterior peripheral surface of the piston 310 to a first groove 328 and a second groove 330 defined in the exterior peripheral surface of the piston 310. The first groove 328 is bounded by a flanged portion 332 at a proximal end of the piston 310, and the second groove 330 is bounded by a flanged portion 334 at a distal end of the piston 310.

The pressurized fluid thus applies a force on an annular surface area "$A_4$" of the flanged portion 332 in the proximal axial direction, and applies a force on an annular surface area "$A_5$" of the flanged portion 334 in the distal axial direction opposite the proximal axial direction. Therefore, the resultant force acting on the piston 310 can be estimated by the following equation $$F = PA_1 + PA_4 - PA_5 = P(A_1 + A_4 - A_5) \quad (2)$$

In an example, $A_4$ could be equal to $A_2$, and $A_5$ may be equal to $A_3$. However, in another example, $A_4$ might not be equal to $A_2$, and $A_5$ might not be equal to $A_3$. In either example, the area difference $A_5 - A_4$ is substantially equal to the area $A_1$. As a result, $(A_1 + A_4 - A_5)$ is substantially equal to zero, and thus the force "F" defined by equation (2) is substantially equal to zero (e.g., within a threshold force value, such as 2 lbs, from zero lbs).

As such, the piston 310 is similar to the piston 138 in that the piston 310 is pressure-balanced as the pressurized fluid exerts opposing forces on the piston 310 on surface areas that are selected such that the resultant force exerted on the piston 310 is substantially equal to zero. With this configuration, similar to the spring 144, the spring 316 could be a soft spring having a small spring rate that is sufficient to bias the piston 310 and the pin 314 in the proximal direction. For example, the spring 316 may exert a small force in a range between 2 lbs and 4 lbs.

As such, the valve 300 represents a variation in the configuration of the components relative to the valve 200. With the configuration shown in FIG. 3, the valve 300 is shorter than the valve 200 as the valve 300 does not include an elongated chamber that houses the detent mechanism shown in FIGS. 1-3. However, in other examples, the detent mechanism could also be added to the valve 300.

Further, the valve 300 does not include the spacer 140; rather, the solenoid tube 304 is different from the solenoid tube 236, such that the spacer 140 is integrated in the solenoid tube 304. The solenoid tube 304 includes the hole 326, which operates as a channel or passage to communicate fluid to the surfaces areas $A_4$ and $A_5$ as described above. In an example, other seals could be added to the valve 300 or any of the valves described above to isolate the chamber in which the spring 316 (or the spring 144) from the atmosphere or the environment of the valve.

Figure 6:
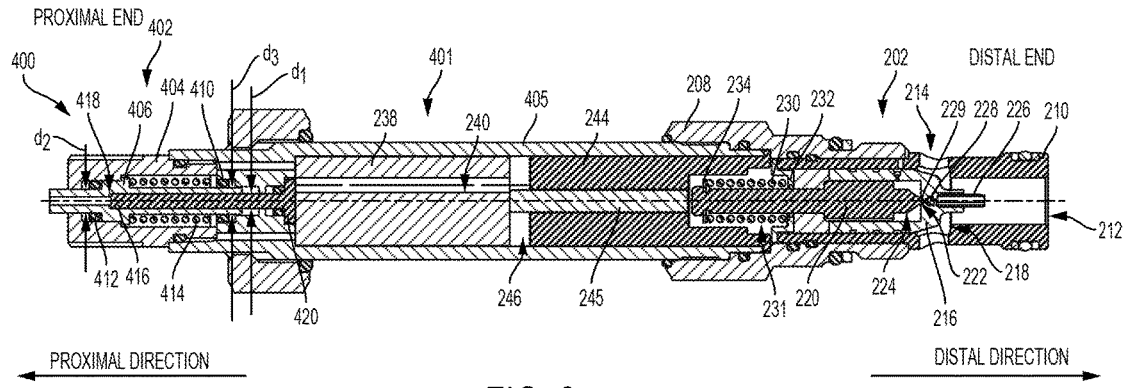
FIG. 6 illustrates a cross-sectional view of another example valve, in accordance with an example implementation.

FIG. 6 illustrates a cross-sectional view of another valve 400, in accordance with an example implementation. Similar components between the valves 200, 300 and the valve 400 are designated with the same reference numbers. As shown, the main valve section 202 is the same in the valves 200, 300 and the valve 400. The valve 400 includes a push-type solenoid actuation mechanism 401 that is similar to the push-type solenoid actuation mechanisms 204, 302.

The valve 400 includes a push-type manual actuation mechanism 402 having a sleeve 404 that is fixedly disposed partially in a cavity defined within a proximal end of a solenoid tube 405 of the push-type solenoid actuation mechanism 401. The sleeve 404 is coaxial with the solenoid tube 405.

Further, the sleeve 404 defines a respective longitudinal cylindrical cavity therein and houses a piston 406 that is axially movable within the longitudinal cylindrical cavity of the sleeve 404. The piston 406 has a different configuration compared to the pistons 138, 310; however, similar to the pistons 138, 310, the piston 406 is also pressure-balanced.

Particularly, similar to the valves 200, 300 and as similarly described above with respect to FIGS. 4-5, pressurized fluid received at the second port 214 is communicated through unsealed spaces to chambers or spaces formed between the solenoid tube 405 and the piston 406 and between the sleeve 404 and the piston 406. The pressurized fluid then acts on a cross sectional area characterized by diameter "$d_2$" of the piston 406 in the proximal direction and acts on a cross sectional area characterized by diameter "$d_3$" of the piston 406 in the distal direction. The diameters "$d_1$," "$d_2$," and "$d_3$," are selected such that $d_3^2 - d_2^2 = d_1^2$. As such, the difference between the cross sectional area characterized by the diameter "$d_3$" and the cross sectional area characterized by the diameter "$d_2$" is substantially equal to the cross sectional area of the pin 416 characterized by the diameter "$d_1$" on which the pressurized fluid in the longitudinal channel 240 acts in the proximal direction. As a result, the piston 406 is pressure-balanced.

A first seal 410 is disposed about the piston 406, and specifically about a section of the piston 406 having the diameter "$d_3$," whereas a second seal 412 is disposed about the piston 406, and specifically about a section of the piston 406 having the diameter "$d_2$." The seals 410, 412 are disposed about sections of the piston 406 having diameters that could be smaller than respective diameters about which corresponding seals of the valve 100, 200, and 300 are disposed. As such, the piston 406 may be subjected to less friction forces from the seals 410, 412 as the piston 406 moves axially because the seals 410, 412 may cause friction about a smaller circumferential area compared to the seals in the valves 100, 200, and 300.

The valve 400 further includes a spring 414 disposed in a chamber formed between the interior peripheral surface of the sleeve 404 and the exterior peripheral surface of the piston 406. The spring 414 corresponds to the spring 144 of the valves 100, 200 and the spring 316 of the valve 300. However, the springs 144, 316 are disposed in respective chambers that are subjected to the atmosphere or the environment around their respective valves 100, 200, and 300. On the other hand, the chamber housing the spring 414 is isolated from the atmosphere or the environment of the valve 400 by way of the seal 412. The chamber that houses the spring 414 may be filled with hydraulic oil during operation of the valve 400. With this configuration, the probability of corrosion of the spring 414 may be reduced.

The piston 406 defines therein a respective longitudinal cylindrical cavity that houses a pin 416 that is similar to the pin 314 described above. The piston 406 further defines a shoulder 418 (similar to the shoulders 150, 318) against which the pin 416 rests. In particular, a proximal end of the pin 416 interfaces with the interior surface of the piston 406 at the shoulder 418, and thus the pin 416 engages the piston 406, such that forces applied to the pin 416 in the proximal direction are transferred to the piston 406 via the shoulder 418.

As shown in FIG. 6, the piston 406 may protrude from the sleeve 404 in a proximal direction. In an example, to actuate the valve 400, the portion of the piston 406 that protrudes from the sleeve 404 may be pushed in the distal direction. In another example, a knob, lever, or button may be coupled to the portion of the piston 406 that protrudes from the sleeve 404 in the proximal direction and such knob, lever, or button may be pushed in the distal direction to actuate the valve 400.

As the piston 406 is pushed in the distal direction against the force of the spring 414, and due to interaction between the piston 406 and the pin 416 at the proximal end of the pin 416 and the shoulder 418, the pin 416 is pushed along with the piston 406 in the distal direction. Due to the pressure-balanced configuration of the piston 406, the spring 414 may have a smaller spring rate and may be configured to apply a smaller force (e.g., 6 lbs) on the piston 406 in the proximal direction compared to a non-pressure-balanced configuration.

A distal end of the pin 416 includes a flanged portion 420 that interfaces with the armature 238 similar to the flanged portion 324 interfacing with the armature 238 as described above. Thus, a force applied by the piston 406 on the pin 416 in the distal direction is transferred to the armature 238. The force transferred to the armature 238 may cause the valve 400 to operate similar to the valves 200, 300 as described above with respect to the FIGS. 4-5.

FIG. 6 illustrates the valve 400 without a detent mechanism. However, in other example implementations, a detent mechanism could be added to the valve 400.

The configurations of the valves 300, 400 thus represent example variations from the valve 200, and other configurations are also possible. Regardless of the details of construction of the push-type solenoid actuator mechanisms 204, 302, 401 and the push-type manual actuation mechanisms 132, 306, 402, the piston 138, 310, 406 is pressure-balanced. The pressure-balanced piston configuration enhances operation of the push-type manual actuation mechanism 132, 306, 402, reduces complexity of the detent mechanism if the valve includes such a detent mechanism, and achieves consistent operation of the valve regardless of the inlet pressure level.

Further, although the valves 100, 200, 300, and 400 are shown as poppet valves, the push-type manual actuation mechanisms 132, 306, 402 having respective pressure-balanced pistons could also be implemented for other valve configurations. For instance, the push-type manual actuation mechanisms 132, 306, 402 described herein could be coupled to a spool of a spool valve to enhance manual actuation of the spool valve, reduce complexity of the spool valve, and achieve consistent operation regardless of an inlet pressure level. As such, the description above with respect to the push-type manual actuation mechanisms can be applied to any valve with axially or longitudinally movable element(s), whether the movable element(s) are poppets or spools.

FIG. 7 illustrates a flowchart of an example method 500 of operating a valve, in accordance with an example implementation. The method 500 shown in FIG. 7 presents an example of a method that could be used with any of the valves (e.g., the valves 100, 200, 300, 400) described above and shown in FIGS. 1-6, for example. In the description below of the method 500, the valves 100, 200 are used as examples to illustrate the method 500.

The method 500 may include one or more operations, functions, or actions as illustrated by one or more of blocks 502-504. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 502, the method 500 includes pushing the knob 134 of the push-type manual actuation mechanism 132 of the valve 100, 200 where the knob 134 is coupled to the piston 138 of the push-type manual actuation mechanism 132 where the piston 138 is pressure-balanced, and where pushing the knob 134 causes the piston 138 to move axially, thereby causing a detent mechanism of the push-type manual actuation mechanism 132 to be engaged. As described above, in an example, the valve may be a manually-actuated and may have the push-type manual actuation mechanism 132. In other examples, the valve may be actuated by a solenoid or may be pneumatically or hydraulically actuated. In these examples, the valve may include the push-type manual actuation mechanism 132 for manual override if a primary actuation mechanism does not operate properly. The push-type manual actuation mechanism 132 is configured such that the pistons 138 is pressure-balanced as described above.

The push-type manual actuation mechanism 132 may include the detent mechanism described above with respect to FIGS. 1-3. As such, pushing the knob 134 may cause the groove 172 disposed on the external peripheral surface the piston 138 to be aligned with the balls 168A, 168B. The spring 164 may push the spacer 166, which pushes the balls 168A, 168B into the groove 172, and the detent mechanism is thus engaged.

As mentioned above, with respect to the valve 100 pushing the knob 134 causes the poppet 110 to move, thereby opening the valve 100 and allowing fluid to flow from the first port 106 to the second port 108 or vice versa. With respect to the valve 200, pushing the knob 134 causes the piston 138 and the pin 142 to move, causing the armature 238 and the push pin 245 to move, thus causing second poppet 220 and the first poppet 216 to move therewith. As a result, flow through the valve 200 is restricted or blocked.

At block 504, the method 500 includes releasing the knob 134 to lock the piston 138 in place, thereby locking the valve 100, 200 in a particular state. In the case of the valve 100, the valve 100 is locked in an open state. In the case of the valve 200, the valve 200 is locked in a restricted-flow or closed state. The detent mechanism precludes the piston 138 from returning (e.g., moving in the proximal direction) because the spring 164 maintains pressure on the spacer 166, which maintains respective pressure on the balls 168A, 168B, thus holding the piston 138 in position. With this configuration, the piston 138 is locked in place even when the knob 134 is released, and the valve 100, 200 is thus locked in the particular state.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A push-type manual actuation mechanism for a valve, the push-type manual actuation mechanism comprising:
   a piston configured to be pushed in a first axial direction, the piston having: (i) a first flanged portion with a first annular surface area, (ii) a second flanged portion with a second annular surface area, wherein the first flanged portion and the second flanged portion project from an exterior peripheral surface of the piston, (iii) a longitudinal cavity bounded by an interior peripheral surface of the piston, and (iv) a shoulder on the interior peripheral surface of the piston; and
   a pin disposed in the longitudinal cavity of the piston, wherein the pin has a flanged portion interfacing with and resting against the shoulder of the piston, such that a force applied on the pin in a second axial direction, opposite the first axial direction, is transferred to the piston, and wherein a difference between the second annular surface area of the second flanged portion and the first annular surface area of the first flanged portion is substantially equal to a cross-sectional area of the pin.

2. The push-type manual actuation mechanism of claim 1, further comprising:
   a knob coupled to the piston such that as the knob is pushed in the first axial direction, the piston moves in the first axial direction along with the knob.

3. The push-type manual actuation mechanism of claim 2, wherein the knob has a groove on an interior peripheral surface of the knob, wherein the piston has a groove on the exterior peripheral surface of the piston, and wherein the push-type manual actuation mechanism further comprises:
   a roll pin disposed partially in the groove of the knob and partially in the groove of the piston to couple the piston to the knob.

4. The push-type manual actuation mechanism of claim 2, wherein the longitudinal cavity is a first longitudinal cavity, and wherein the push-type manual actuation mechanism further comprises:
   a sleeve having a second longitudinal cavity therein, wherein the piston is disposed, and is axially movable, in the second longitudinal cavity of the sleeve.

5. The push-type manual actuation mechanism of claim 4, wherein the push-type manual actuation mechanism further comprises a detent mechanism, wherein the detent mechanism comprises:
   a plurality of balls disposed in a radial array about the sleeve;
   a spacer that is ring-shaped and interfacing with the plurality of balls; and
   a spring disposed about an exterior peripheral surface of the sleeve between: (i) a respective shoulder projecting from the exterior peripheral surface of the sleeve, and (ii) the spacer, wherein the piston includes a groove defined on the exterior peripheral surface of the piston, such that as the piston moves in the first axial direction, the spring applies a force to the spacer in the second axial direction to cause the spacer to push the plurality of balls, causing the plurality of balls to move partially in the groove so as to lock the piston in place relative to the sleeve.

6. The push-type manual actuation mechanism of claim 1, further comprising:
   a spring interacting with the piston, such that the spring applies a spring force on the piston in the second axial direction.

7. The push-type manual actuation mechanism of claim 6, wherein the spring is disposed between the flanged portion of the pin and a spacer disposed adjacent the piston.

8. A push-type manual actuation mechanism for a valve, the push-type manual actuation mechanism comprising:
   a knob;
   a sleeve having a first longitudinal cavity therein;
   a piston disposed in the first longitudinal cavity coaxial with the sleeve, wherein the knob is coupled to the piston such that as the knob is pushed in a first axial direction, the piston moves in the first axial direction along with the knob, wherein the piston has: (i) a first flanged portion having a first annular surface area, (ii)

a second flanged portion having a second annular surface area, wherein the first flanged portion and the second flanged portion project from an exterior peripheral surface of the piston, (iii) a second longitudinal cavity bounded by an interior peripheral surface of the piston, and (iv) a shoulder on the interior peripheral surface of the piston; and a pin disposed and axially movable in the second longitudinal cavity of the piston, wherein an end of the pin is configured to be subjected to pressurized fluid from an inlet of the valve, wherein the pin has a flanged portion interfacing with and resting against the shoulder of the piston, such that a force applied on the end of the pin via the pressurized fluid in a second axial direction opposite the first axial direction is transferred to the piston, and wherein a difference between the second annular surface area of the second flanged portion and the first annular surface area of the first flanged portion is substantially equal to a cross-sectional area of the pin.

9. The push-type manual actuation mechanism of claim 8, wherein the knob has a groove on an interior peripheral surface of the knob, wherein the piston has a groove on the exterior peripheral surface of the piston, and wherein the push-type manual actuation mechanism further comprises:
   a roll pin disposed partially in the groove of the knob and partially in the groove of the piston to couple the piston to the knob.

10. The push-type manual actuation mechanism of claim 8, further comprising:
   a spring interacting with the piston, such that the spring applies a spring force on the piston in the second axial direction.

11. The push-type manual actuation mechanism of claim 10, wherein the spring is disposed between the shoulder of the piston and a spacer disposed adjacent the piston.

12. The push-type manual actuation mechanism of claim 8, further comprising a detent mechanism, wherein the detent mechanism comprises:
   a plurality of balls disposed in a radial array about the sleeve;
   a spacer that is ring-shaped and interfacing with the plurality of balls; and
   a spring disposed about an exterior peripheral surface of the sleeve between: (i) a respective shoulder projecting from the exterior peripheral surface of the sleeve, and (ii) the spacer, wherein the piston has a groove defined on the exterior peripheral surface of the piston, such that as the piston moves in the first axial direction, the spring applies a force on the spacer in the second axial direction, and the spacer pushes the plurality of balls causing the plurality of balls to move partially in the groove so as to lock the piston in place relative to the sleeve.

13. A valve comprising:
   a main valve section comprising: (i) a housing, (ii) a sleeve disposed in the housing, wherein the sleeve defines a first port and a second port, and (iii) a movable element configured to move axially in the sleeve; and
   a push-type manual actuation mechanism comprising:
      a knob,
      a piston coupled to the knob, wherein the piston has: (i) a first flanged portion having a first annular surface area, (ii) a second flanged portion having a second annular surface area, wherein the first flanged portion and the second flanged portion project from an exterior peripheral surface of the piston, (iii) a longitudinal cavity bounded by an interior peripheral surface of the piston, and (iv) a shoulder on the interior peripheral surface of the piston, and
      a pin disposed in the longitudinal cavity of the piston, wherein the pin is disposed adjacent the movable element of the main valve section, wherein the pin has a flanged portion interfacing with and resting against the shoulder of the piston, such that a force applied on the pin in a first axial direction via pressurized fluid received at the first port or the second port acting on a cross-sectional area of the pin is transferred to the piston, and wherein a difference between the second annular surface area of the second flanged portion and the first annular surface area of the first flanged portion is substantially equal to the cross-sectional area of the pin, such that when pressurized fluid is communicated to the first annular surface area and the second annular surface area, the piston is pressure-balanced, and wherein when the knob is pushed in a second axial direction opposite the first axial direction, the piston moves in the second axial direction along with the knob, causing the pin to move in the second axial direction, engage the movable element, and cause the movable element to move in the second axial direction.

14. The valve of claim 13, further comprising:
   a push-type solenoid actuator mechanism comprising:
      a solenoid tube disposed partially within the housing of the main valve section; and
      an armature disposed within the solenoid tube adjacent the pin, wherein axial motion of the pin in the second axial direction causes the armature to move axially along with the pin to cause the movable element to move axially in the second axial direction.

15. The valve of claim 14, further comprising:
   a spacer that is ring-shaped and disposed within the solenoid tube, wherein the piston is disposed partially within the spacer, such that pressurized fluid is allowed to traverse unsealed spaces between the spacer and the solenoid tube and between the piston and the spacer so as to be communicated to the first annular surface area and the second annular surface area.

16. The valve of claim 15, wherein the push-type manual actuation mechanism further comprises:
   a spring interacting with the piston, such that the spring applies a spring force on the piston in the first axial direction.

17. The valve of claim 13, wherein the sleeve is a first sleeve, wherein the longitudinal cavity of the piston is a first longitudinal cavity, and wherein the push-type manual actuation mechanism further comprises:
   a second sleeve having a second longitudinal cavity therein, wherein the piston is disposed, and is axially movable, in the second longitudinal cavity of the second sleeve.

18. The valve of claim 17, wherein the push-type manual actuation mechanism further comprises a detent mechanism, wherein the detent mechanism comprises:
   a plurality of balls disposed in a radial array about the second sleeve;
   a spacer that is ring-shaped, slidably disposed about the second sleeve, and interfacing with the plurality of balls; and
   a spring disposed about an exterior peripheral surface of the second sleeve between: (i) a shoulder projecting from the exterior peripheral surface of the second sleeve, and (ii) the spacer, wherein the piston has a groove on the exterior peripheral surface of the piston, such that as the piston moves in the second axial direction, the spring applies a force on the spacer in the first axial direction, and the spacer causes the plurality of balls to move partially in the groove so as to lock the piston in place relative to the second sleeve.

19. The valve of claim 13, wherein the knob has a groove on an interior peripheral surface of the knob, wherein the piston has a groove on the exterior peripheral surface of the piston, and wherein the push-type manual actuation mechanism further comprises a roll pin disposed partially in the groove of the knob and partially in the groove of the piston to couple the piston to the knob.

20. The valve of claim 13, wherein the knob is configured as a push button coupled to an end of the piston.

* * * * *